United States Patent
Norona et al.

(10) Patent No.: US 8,251,156 B2
(45) Date of Patent: Aug. 28, 2012

(54) COMPLIANT SHIFTING MECHANISM FOR RIGHT ANGLE DRILL

(75) Inventors: Joao Norona, Baltimore, MD (US); Thomas J. Bodine, Glenwood, MD (US)

(73) Assignee: Black & Decker Inc., Newark, DE (US)

( * ) Notice: Subject to any disclaimer, the term of this patent is extended or adjusted under 35 U.S.C. 154(b) by 378 days.

(21) Appl. No.: 12/604,431

(22) Filed: Oct. 23, 2009

(65) Prior Publication Data
US 2010/0108337 A1    May 6, 2010

Related U.S. Application Data

(60) Provisional application No. 61/197,771, filed on Oct. 30, 2008.

(51) Int. Cl.
*B23Q 5/12* (2006.01)

(52) U.S. Cl. ........... 173/1; 173/47; 173/52; 173/216; 173/221

(58) Field of Classification Search ........ 173/1, 47, 173/52, 216, 221
See application file for complete search history.

(56) References Cited

U.S. PATENT DOCUMENTS

| | | | | |
|---|---|---|---|---|
| 3,876,014 A | * | 4/1975 | Moores, Jr. | 173/47 |
| 3,960,035 A | * | 6/1976 | Workman et al. | 475/125 |
| 4,319,140 A | | 3/1982 | Paschke | |
| 4,473,753 A | * | 9/1984 | Izumi et al. | 290/45 |
| 5,692,575 A | * | 12/1997 | Hellstrom | 173/216 |
| 6,070,675 A | * | 6/2000 | Mayer et al. | 173/48 |
| 6,315,060 B1 | * | 11/2001 | Schuda et al. | 173/132 |
| 6,796,921 B1 | * | 9/2004 | Buck et al. | 475/299 |
| 6,962,550 B2 | * | 11/2005 | Kadota | 477/15 |
| 7,220,211 B2 | * | 5/2007 | Potter et al. | 475/298 |
| 7,520,354 B2 | * | 4/2009 | Morrow et al. | 180/65.31 |
| 2002/0050364 A1 | * | 5/2002 | Suzuki et al. | 173/1 |
| 2002/0096343 A1 | * | 7/2002 | Potter et al. | 173/216 |
| 2006/0118314 A1 | * | 6/2006 | Aeberhard et al. | 173/1 |
| 2006/0237205 A1 | * | 10/2006 | Sia et al. | 173/48 |

* cited by examiner

*Primary Examiner* — Brian D Nash
(74) *Attorney, Agent, or Firm* — Harness, Dickey & Pierce, P.L.C.

(57) ABSTRACT

A compliant shifting mechanism can change the operation of a power tool between first and second operating conditions. The shifting mechanism can provide two distinct forces on a gear set during movement of the gear set between the two operating conditions. The shifting mechanism can provide a user with a tactile sensation of the completion of the transition between the two operating conditions without the gear set completing the full transition. A shifting mechanism can automatically complete the change between operating conditions, regardless of an alignment between the gear set and another component. The two distinct forces can be a torsional resistance force and a bending resistance force.

18 Claims, 11 Drawing Sheets

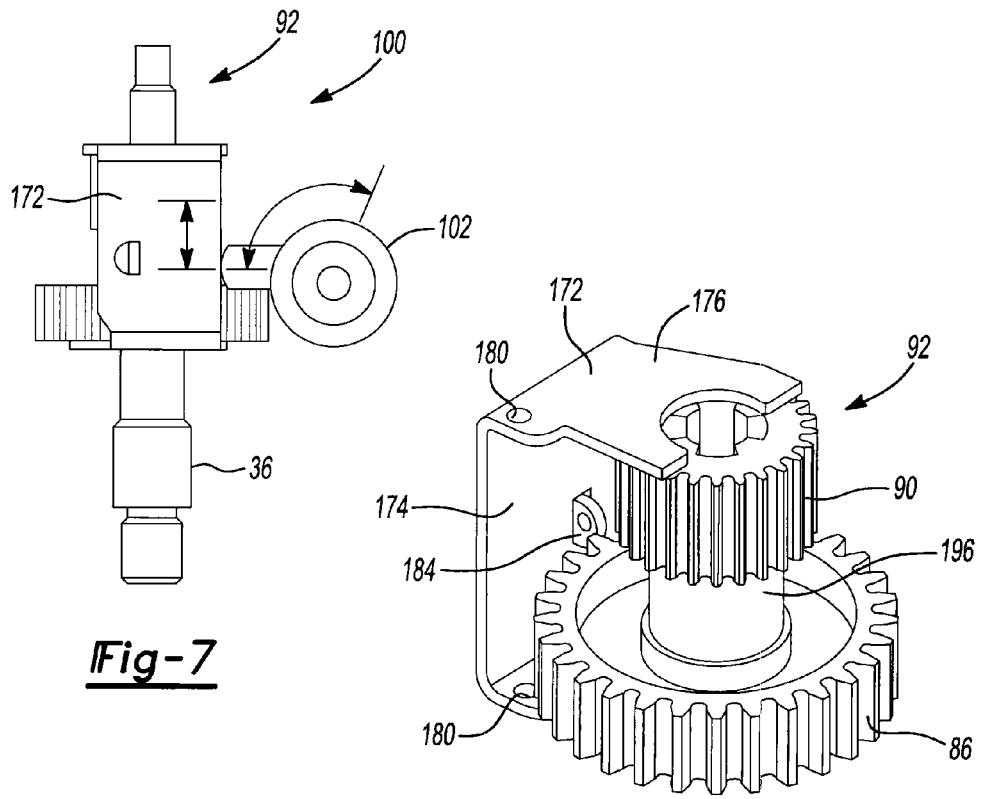
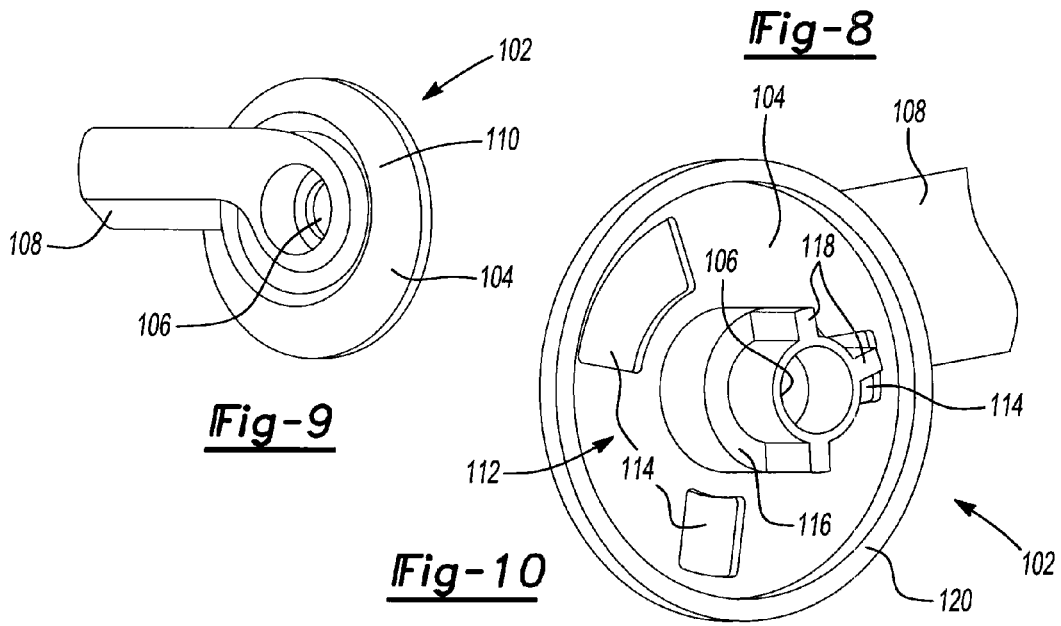

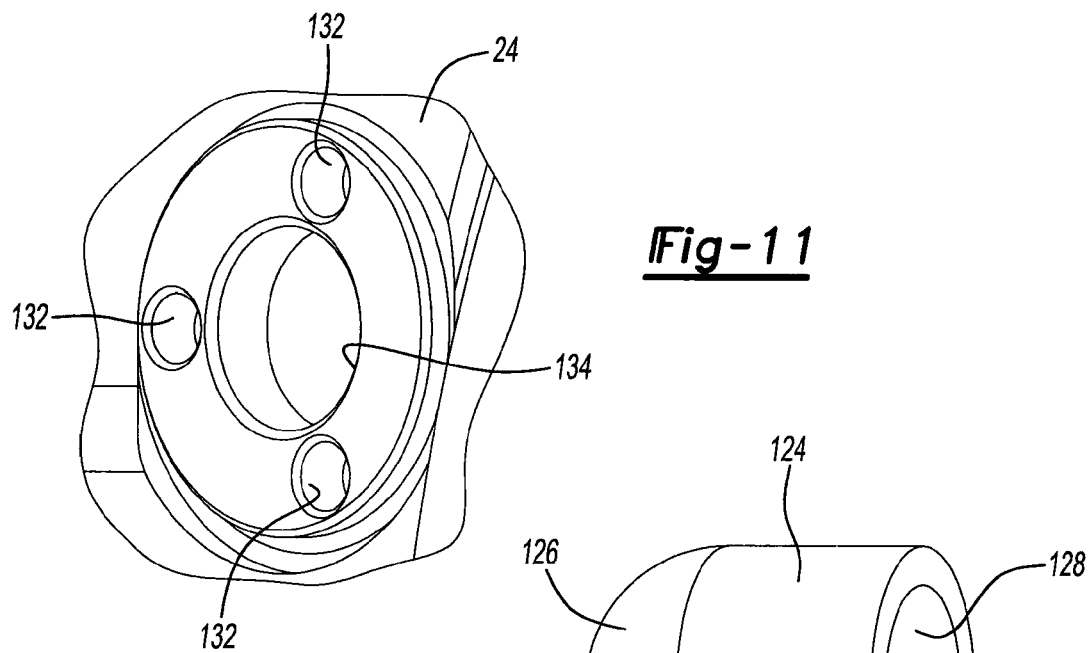
*Fig-11*
*Fig-12*
*Fig-13*
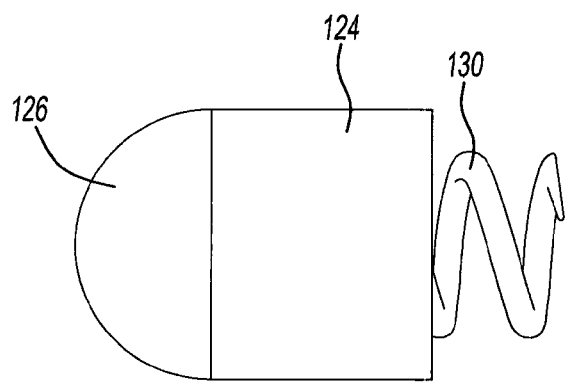
*Fig-14*

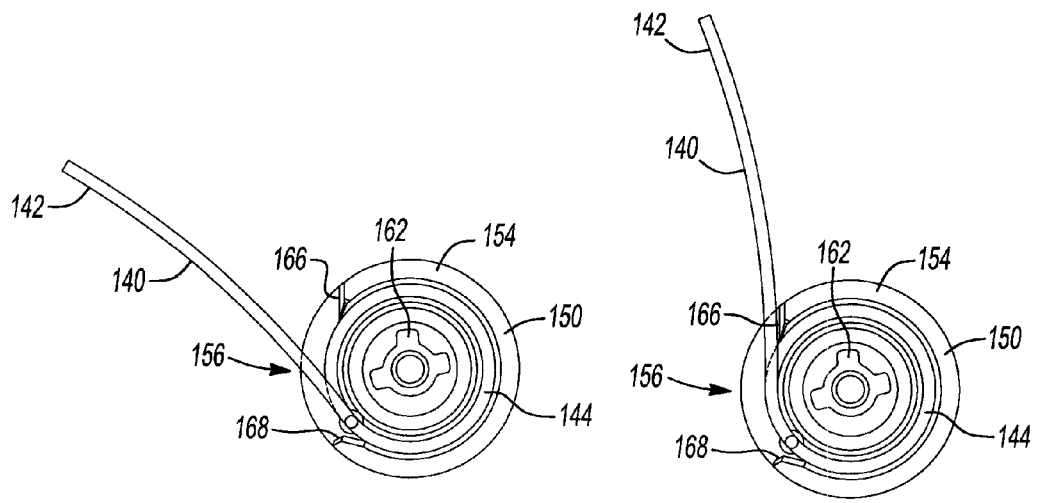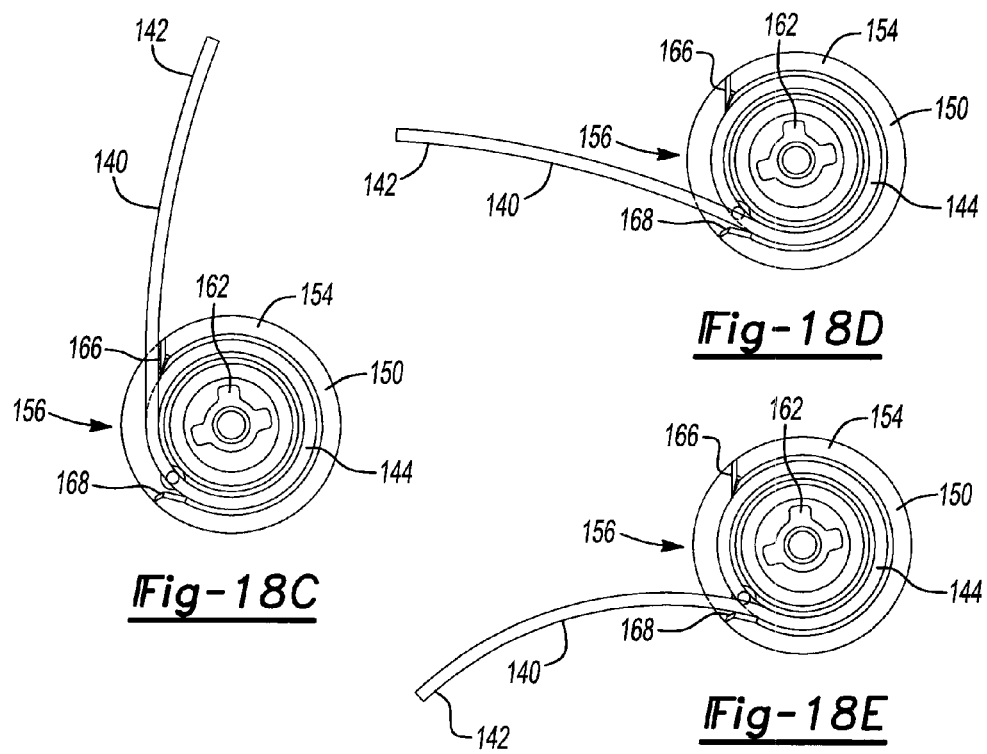

COMPLIANT SHIFTING MECHANISM FOR RIGHT ANGLE DRILL

CROSS-REFERENCE TO RELATED APPLICATIONS

This application claims the benefit of U.S. Provisional Application No. 61/197,771, filed on Oct. 30, 2008. The entire disclosure of the above application is incorporated herein by reference.

FIELD

The present disclosure relates to a compliant shift mechanism that can be used to shift a gear assembly between two different operating conditions.

BACKGROUND

This section provides background information related to the present disclosure which is not necessarily prior art.

Certain types of drills and drivers can utilize a transmission between a motor and a drive spindle to apply a driving torque to the drive spindle. The transmission can include a plurality of gears or gear sets. Some types of drills and drivers utilize gear sets that can provide different speeds of operation. For example, the gear sets can utilize one set of gears to provide relatively low-speed operation while another set of gears can be utilized to provide relatively high-speed operation. The high and low speeds of operation can also provide differing torque values for driving a tool drive spindle.

In these types of drills and drivers, a mechanism to shift or change between the high and low speeds of operation can be used. The shifting between the high and low speeds of operation, however, can be cumbersome and can require multiple steps or operations on the part of the user to achieve the change in operation. The switching between the high and low speeds can involve moving the sets of gears within the drill or driver so that different gears are being driven to provide the different operations. A manually operated mechanical switching device can be used to move the gear sets to provide the different modes of operation. The moving of the gear sets can require the alignment of features on the drive spindle, such as splines, with the different gears so that a desired operation is achieved.

The splines and the corresponding features on the gears, however, are frequently not aligned at the time of switching between the high and low speed operation. As a result, the user cannot completely move the mechanical switching device. Rather, the user must continue to attempt to move the mechanical switching device while rotating the spindle by hand to achieve the required alignment and allow the mechanical switching device to be moved to the new position corresponding to the desired mode of operation. As a result, a cumbersome two-handed operation is required. Additionally, the requirement for a two-handed operation can increase the time required to do the shifting between the gear sets.

SUMMARY

This section provides a general summary of the disclosure, and is not a comprehensive disclosure of its full scope or all of its features.

A power tool shifting mechanism according to one aspect of the present disclosure can include a first member movable between first and second positions. A shifting member is coupled to at least one drive member and moves between third and fourth positions in response to movement of the first member between the respective first and second positions. The at least one drive member moves with movement of the shifting member. A compliant member is coupled to the first member and to the shifting member. The compliant member causes the shifting member to move between the third and fourth positions in response to movement of the first member between the respective first and second positions. The compliant member applies a first force of a first magnitude on the shifting member that biases the shifting member toward the fourth position during a first portion of the movement of the shifting member from the third position to the fourth position. The compliant member applies a second force of a second magnitude on the shifting member that biases the shifting member toward the fourth position during a second portion of the movement of the shifting member from the third position to the fourth position. The first and second magnitudes are different from one another.

A power tool according to the present disclosure can include the shifting mechanism. The power tool can further include a motor, an output member, and a transmission that couples the motor to the output member. The transmission can drive movement of the output member in response to energization of the motor. The transmission can include the at least one drive member which can be a gear set that is movable between positions corresponding to first and second operating conditions for the power tool.

A method of switching operation of a power tool between a first operating condition and a second operating condition according to the present disclosure can include manually moving a first member between a first position corresponding to a first operating condition and a second position corresponding to a second operating condition. A shifting member coupled to a first member with a compliant member can be moved between third and fourth positions in response to movement of the first member between the respective first and second positions. A compliant member can be coupled to the first member. At least one drive member can be moved with movement of the shifting member. The at least one drive member can be coupled to the shifting member and the movement of the at least one drive member can change operation of the power tool between the first and second operating conditions. A compliant member can apply a first force of a first magnitude on the shifting member during a first portion of movement of the shifting member from the third position to the fourth position. The first force can bias the shifting member toward the fourth position. The compliant member can apply a second force of a second magnitude on the shifting member during a second portion of movement of the shifting member from the third position to the fourth position, the second force biasing the shifting member toward the fourth position. The first and second magnitudes can be different from one another.

The shifting mechanism, a power tool incorporating the same, and a method of changing operation of a top power tool between first and second operating conditions according to the present disclosure can be achieved by imparting two distinct forces on a gear set. A user can be provided with a tactile sensation of the completion of the transition between the two operating conditions without the gear set completing the full transition. A shifting mechanism can automatically complete the change between the two operating conditions regardless of an alignment between an output member and the gear set. A user is not required to maintain or hold onto the first member as the first member can be fully engaged regardless of the initial alignment between the output member and the gear set.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a side view of the speed-change gear set and compliant shifting mechanism of FIG. 6;

FIG. 8 is a perspective view of the speed-change gear set and sliding member of the compliant shifting mechanism;

FIG. 9 is a perspective view of the shift lever of the compliant shifting mechanism showing the outer surface of the shift lever;

FIG. 10 is a fragmented perspective view of the shift lever of FIG. 9 showing the inner surface thereof;

FIG. 11 is an enlarged fragmented perspective view of a portion of the gear case of the drill of FIG. 1 showing the attachment location for the shift lever of the compliant shifting mechanism;

FIGS. 12-14 are perspective views of the respective detent pin cap, detent pin spring, and the dent assembly utilized in the compliant shifting mechanism;

Figure 20:
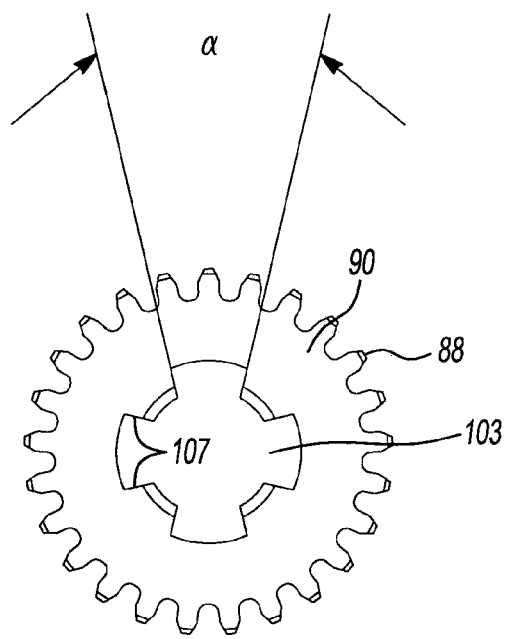
Figure 21:
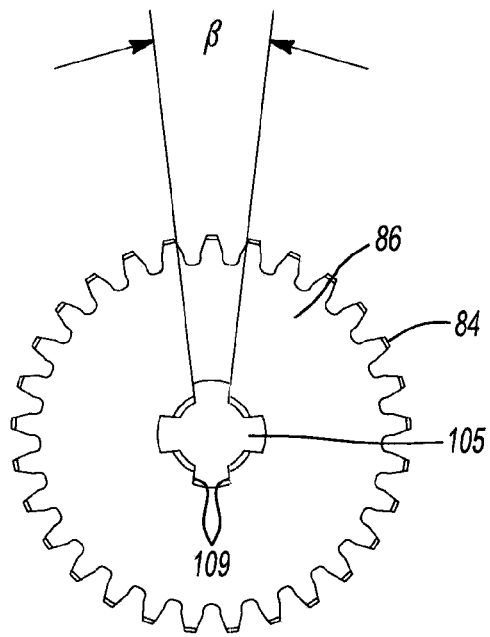

FIGS. 18A-E are simplified representations of the interaction between the shift spring and shift lever of the compliant shift mechanism illustrating the different forces applied by the compliant shifting mechanism on the speed-change gear set;

FIGS. 19A-G are simplified side views showing the operation of the compliant shifting mechanism and its interaction with the speed-change gear set;

FIG. 20 is a top plan view of the high-speed gear of the speed-change gear set; and FIG. 21 is a top plan view of the low-speed gear of the speed-change gear set.

DETAILED DESCRIPTION

Example embodiments will now be described more fully with reference to the accompanying drawings.

Referring to FIGS. 1-4, the present disclosure generally pertains to a power tool 20, such as a powered drill or driver by way of non-limiting example. In the exemplary drawings, power tool 20 is a right-angle drill. Power tool 20 can include a housing 24 having a handle 26 from which a trigger assembly 28 extends. A secondary handle 30 can also extend from housing 24 to provide, for example, an additional hand hold for the user to hold power tool 20. Secondary handle 30 is merely exemplary and it should be appreciated that the use of a secondary handle is optional and that the form of secondary handle 30 can vary from that shown. Additionally, power tool 20 can have a third handle (not shown) to provide yet an additional optional hand hold for the user to hold power tool 20.

Housing 24 can contain, for example, a motor 32 that can drive a transmission 34 that ultimately provides a torque output to a drive spindle 36. Transmission 34 can include a plurality of gears or gear sets to achieve the desired torque output of drive spindle 36 in response to operation of motor 32. A chuck assembly 38 can be attached to an end of drive spindle 36. Trigger assembly 28 can be retracted to energize motor 32 to drive transmission 34. Chuck assembly 38 can be opened and closed to accept various tools or bits.

Figure 3:
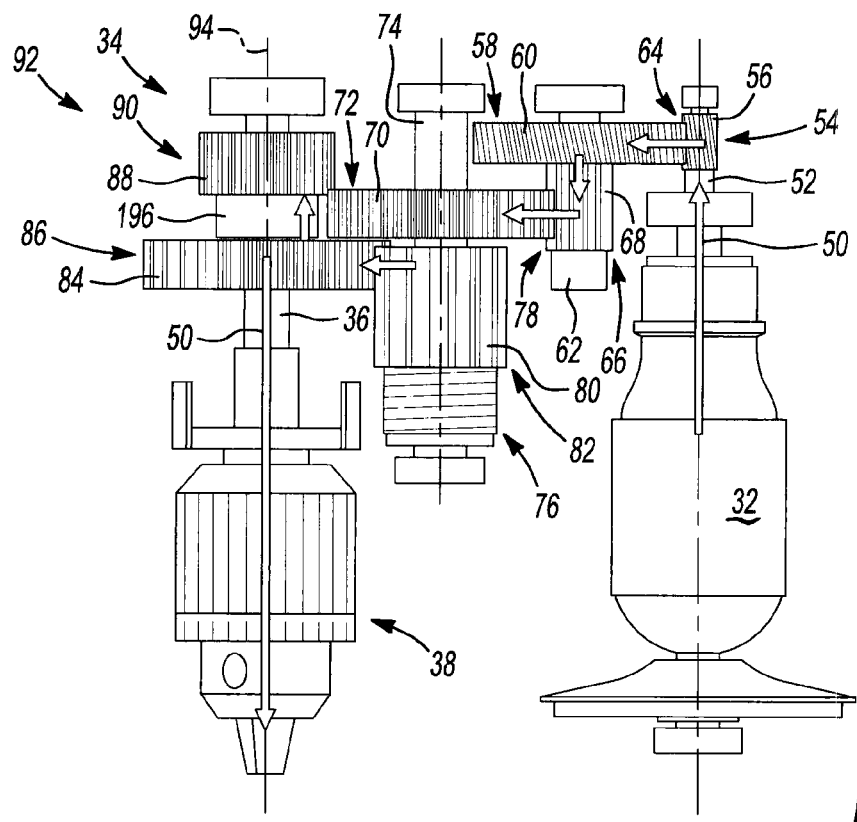
FIGS. 3 and 4 are views of the transmission geartrain layout of the drill of FIG. 1 in a low-speed and high-speed condition, respectively.
Figure 4:
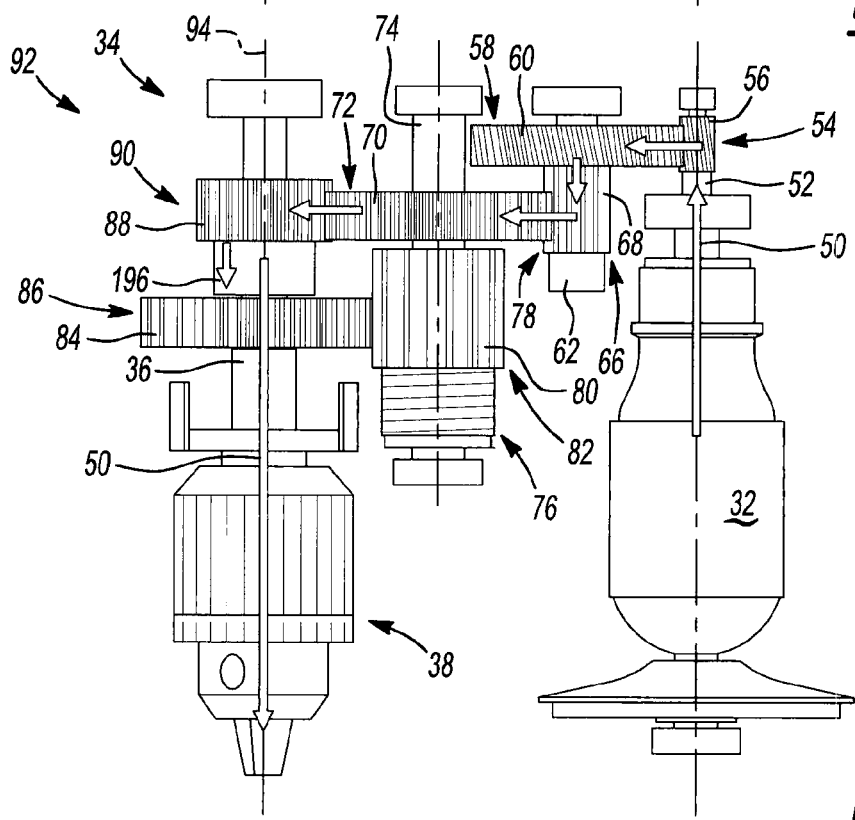

With reference to FIGS. 3 and 4, an exemplary transmission 34 for power tool 20 can establish a torque pathway 50 (illustrated with arrows) that can define a low-speed condition of transmission 34 in accordance with the present disclosure. In this example, motor 32 can connect to an output shaft member 52 having a gear 54. Gear 54 having gear teeth 56 can connect to a gear 58 having gear teeth 60 that is on an intermediate shaft member 62. The meshing of gear 54 on output shaft member 52 with gear 58 on intermediate shaft member 62 can define a first reduction mesh 64.

Intermediate shaft member 62 can have a gear 66 having gear teeth 68 that can mesh with gear teeth 70 of a gear 72 that is on a shaft member 74 that can include a clutch assembly 76. The meshing of gear 58 on intermediate shaft member 62 with gear 72 on shaft member 74 can form a second reduction mesh 78, i.e., two gear reductions. It should be appreciated that intermediate shaft member 62, in some examples, can be omitted. In such examples, gear 54 that is on output shaft member 52 can directly mesh with gear 72 that is on shaft member 74, but this would necessarily omit one of the reduction meshes mentioned above, i.e., a single gear reduction.

Gear teeth 80 of gear 82 can mesh with gear teeth 84 of a low-speed gear 86 that is on drive spindle 36. Gear teeth 70 of gear 72 on shaft member 74 can additionally mesh with gear teeth 88 of a high-speed gear 90 that is on drive spindle 36. Gear teeth 70, 88, however, can maintain a partial engagement with one another in the low speed operation because gear teeth 70, 88 of each of the respective gears 72, 90 do not completely line up, as illustrated in FIG. 3. In this example, however, high-speed gear 90 in the low-speed condition is not engaged to drive spindle 36 (i.e., high-speed gear 90 is free to rotate around drive spindle 36) as described below. The partial engagement can be shown to reduce the effort of moving high-speed gear 90 relative to gear 72 on shaft member 74.

Low-speed gear 86 and high-speed gear 90 are drive members that form a speed-change gear set 92 that, as shown in FIGS. 3 and 4, can move in a longitudinal direction that is generally parallel to a longitudinal axis 94 of drive spindle 36. Low-speed gear 86 and high-speed gear 90 of speed-change gear set 92 can move together between the high-speed condition, as illustrated in FIG. 4, and the low-speed condition, as illustrated in FIG. 3, through operation of a compliant shifting mechanism 100 according to the present disclosure as described below.

Figure 5:
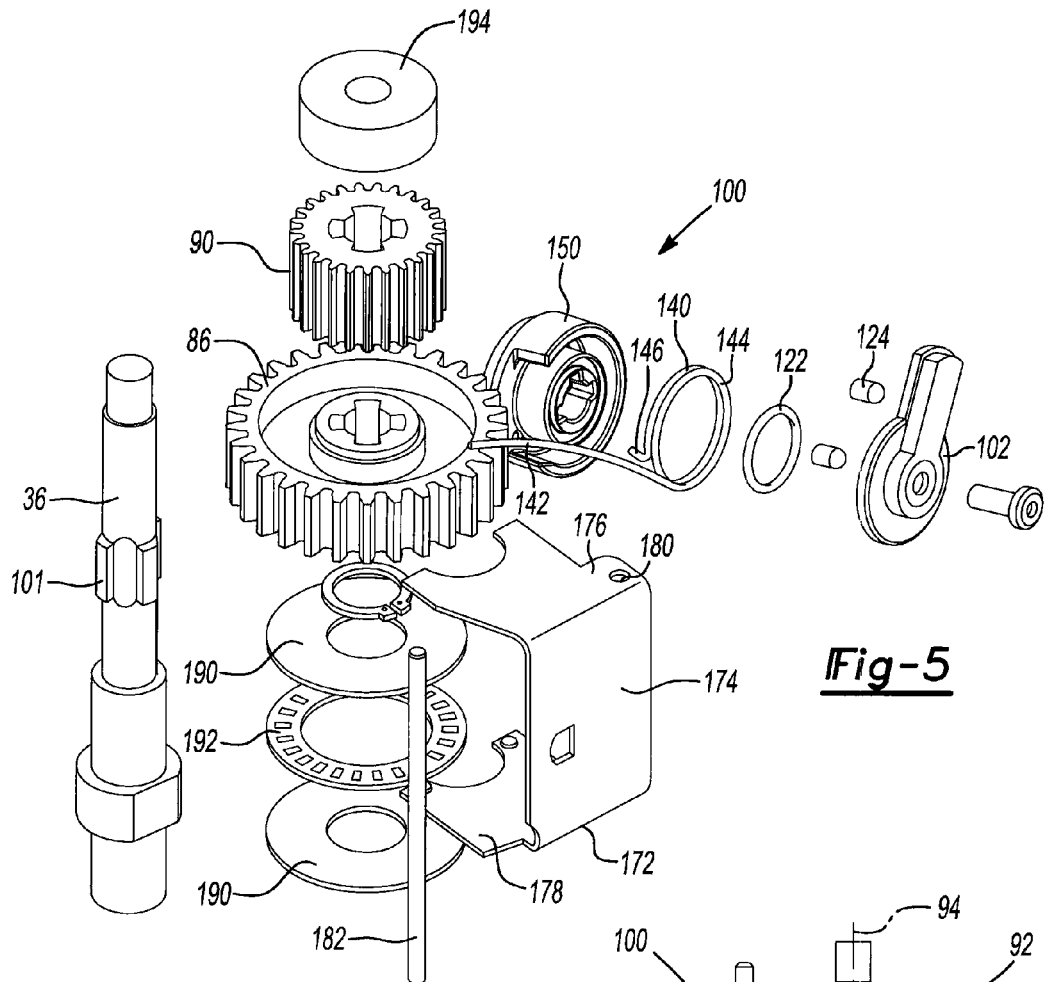
FIG. 5 is an exploded view of the speed-change gear set and the compliant shifting mechanism according to the present disclosure utilized in the drill of FIG. 1.

Referring to FIGS. 5 and 19-20, drive spindle 36 can include a plurality of longitudinally extending splines 101 that can engage with radially extending recesses 103, 105 in the central openings of the high-speed and low-speed gears 90, 86. High-speed and low-speed gears 90, 86 move longitudinally along drive spindle 36 into and out of engagement with splines 101 to change between high and low-speed operation, as described below. Splines 101 can be generally square in cross-section while recesses 103, 105 can get larger as they extend radially. By way of non-limiting example, recesses 103, 105 in respective high-speed and low-speed gears 90, 86 can each have respective sidewalls 107, 109 that extend radially relative to one another in a non-parallel fashion. In one embodiment, sidewalls 107 can extend radially outwardly at an included angle α which can be 15° while sidewalls 109 can extend radially outwardly at an included angle β which can be 10°. The non-parallel extending of sidewalls 107, 109 can facilitate shifting between high and low-speed conditions while motor 32 is driving transmission 34 and drive spindle 36. The expansion of recesses 103, 105 as they extend radially outwardly reduces the precise alignment required to allow high-speed and low-speed gears 90, 86 to move longitudinally along drive spindle 36 into and out of engagement with splines 101.

In the low-speed condition and with reference to FIG. 3, low-speed gear 86 can be engaged with splines 101 of drive spindle 36 (i.e., not free to rotate around drive spindle 36) while high-speed gear 90 can be disengaged from splines 101 of drive spindle 36 (i.e., free to rotate around drive spindle 36). In this arrangement, torque transmitted to low-speed gear 86 from gear 82 can drive drive spindle 36 and ultimately chuck assembly 38.

In the high-speed condition and with reference to FIG. 4, high-speed gear 90 can be engaged with splines 101 of drive spindle 36 (i.e., not free to rotate around drive spindle 36) while low-speed gear 86 can be disengaged from splines 101 of drive spindle 36 (i.e., free to rotate about drive spindle 36). In the high-speed condition, torque transmitted from gear 54 of output shaft member 52 to gear 72 on shaft member 74 is also directed to high-speed gear 90 on drive spindle 36 and thus avoids gear 82. Clutch assembly 76, in the above example, can therefore be bypassed in the high-speed condition, as shown in FIG. 4.

In the low-speed condition, as shown in FIG. 3, gear 82 of clutch assembly 76 can drive low-speed gear 86 which is engaged with splines 101 of drive spindle 36. When the torque value is below a threshold amount, motor 32 can drive drive spindle 36 via low-speed gear 86 and gear 82 of clutch assembly 76. In the high-speed condition, as shown in FIG. 4, motor 32 can drive drive spindle 36 via high-speed gear 90 that can be engaged with splines 101 of drive spindle 36 and gear 72 on shaft member 74. In this arrangement, gear 82 can provide little or no torque to low-speed gear 86.

As noted in the above examples, transmission 34 can be switched between the high-speed condition and the low-speed condition and can provide a 4-to-1 gear ratio. In other aspects, the gear ratios established by the configuration of the gearing discussed throughout the disclosure can be configured in various aspects to, for example, produce different gear ratios to accommodate different requirements for power tool 20. As needed, the torque threshold value can also be adjusted by varying the configuration of clutch assembly 76.

Figure 1:
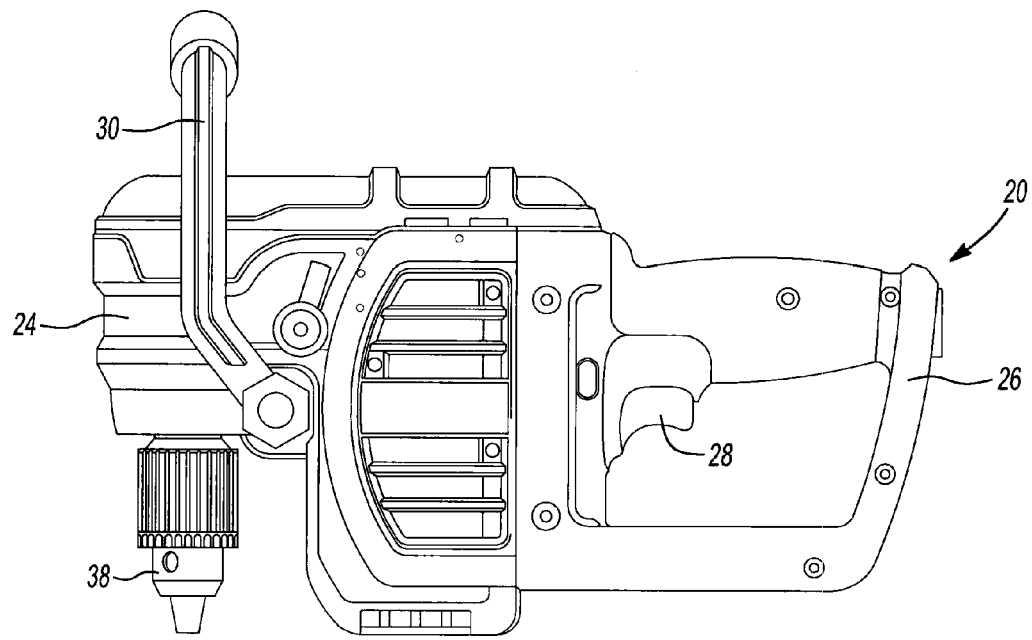
FIG. 1 is a side view of a power tool, in the form of a right-angle drill, that can utilize a compliant shifting mechanism according to the present disclosure.
Figure 2:
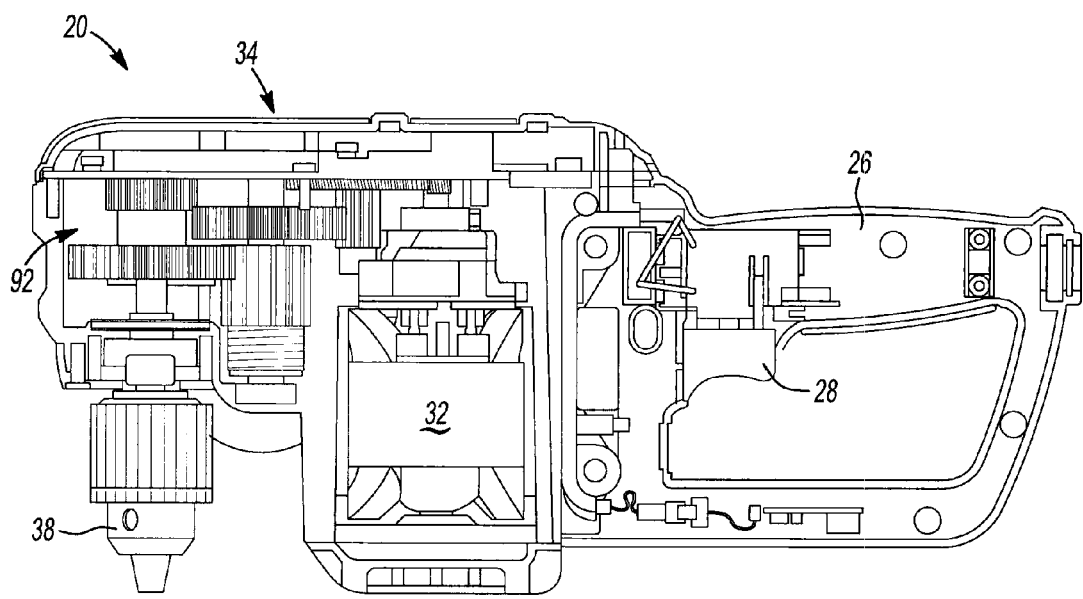
FIG. 2 is a side view of the drill of FIG. 1 illustrating an exemplary internal layout within the drill.

Referring now to FIGS. 5-17, details of compliant shifting mechanism 100 are shown. Compliant shifting mechanism 100 is operable to move speed-change gear set 92 between the high-speed and low-speed operating positions. Compliant shifting mechanism 100 can include a lever 102 which can be positioned on an exterior of housing 24, as shown in FIG. 1. Lever 102 can have a circular base 104 with a central opening 106. A gripping member 108 can extend outwardly from the exterior surface 110. Gripping member 108 facilitates rotation of lever 102 by a user. An inner surface 112 of lever 102 faces housing 24 and can include a plurality of detent pockets 114 which can be spaced around opening 106. An axial projection 116 can extend from inner surface 112 and can include a plurality of engagement lugs 118 which can be spaced apart around opening 106. An annular feature 120 can extend around inner surface 112 of base 104 and can receive an O-ring 122 to provide a seal against housing 24.

Compliant shifting mechanism 100 can include a plurality of detent members 124 which can include a rounded tip 126 and an interior cavity 128 that is open on the end opposite tip 126. A spring 130 can be disposed in cavity 128. The detent members 124 with springs 130 disposed therein can be disposed in pockets 132 (FIG. 11) in housing 24. Pockets 132 can be spaced apart around an opening 134 that is dimensioned to receive projection 116 of lever 102. Springs 130 bias detent members 124 out of pockets 132 which can engage with pockets 114 on inner surface 112 of lever 102. The rounded tips 126 allow detent members 124 to be compressed into pockets 132 against the bias of springs 130 when lever 102 is rotated. Detent members 124 will engage with different ones of pockets 114 on lever 102 as lever 102 is rotated relative to housing 24 to move speed-change gear set 92. Pockets 132 can be positioned such that detent members 124 engage with pockets 114 in only two positions, which can correspond to the high-speed and low-speed operating positions of lever 102.

Compliant shifting mechanism 100 can include a compliant member that can bend or flex, such as a torsion spring 140. Spring 140 can include a free end 142, a coiled section 144, and a fixed end 146 which can extend axially relative to coiled section 144. Spring 140 can be disposed within a spring holder 150. Spring holder 150 can be generally cylindrical and can include a base 152 and an outer wall 154 extending axially therefrom. Outer wall 154 can circumscribe a portion of base 152 and can have ends 166, 168 such that an opening 156 into the interior of spring holder 150 is defined therebetween. A cylindrical projection 158 can extend from base 152 and can be concentric with outer wall 154 with a gap 160 therebetween. Projection 158 can have an axial recess 162 which can be complementary to engagement lugs 118 on projection 116 of lever 102 to receive same. The engagement between engagement lugs 118 and recess 162 can allow lever 102 and spring holder 150 to rotate in unison. Recess 162 can receive a fastener 164 that can retain shift lever 102 to spring holder 150 on housing 24.

Spring 140 can be disposed in spring holder 150 with coiled section 144 disposed in gap 160 between projection 158 and outer wall 154. Fixed end 146 can be disposed in an opening 170 in base 152 which can prevent spring 140 from freely rotating in spring holder 150. Free end 142 of spring 140 can extend outwardly from spring holder 150 through opening 156. Spring 140 can be configured so that free end 142 extends approximately equal distance between either end 166, 168 of opening 156.

Figure 6:
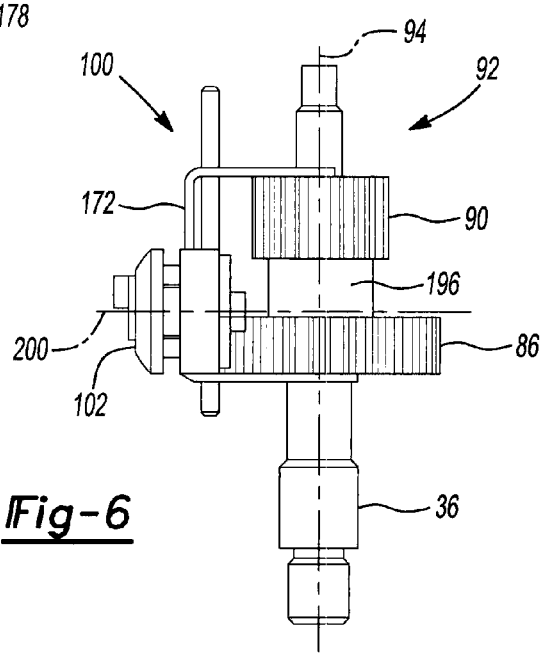
FIG. 6 is a simplified rear plan view of the speed-change gear set and the compliant shifting mechanism.
Figure 15:
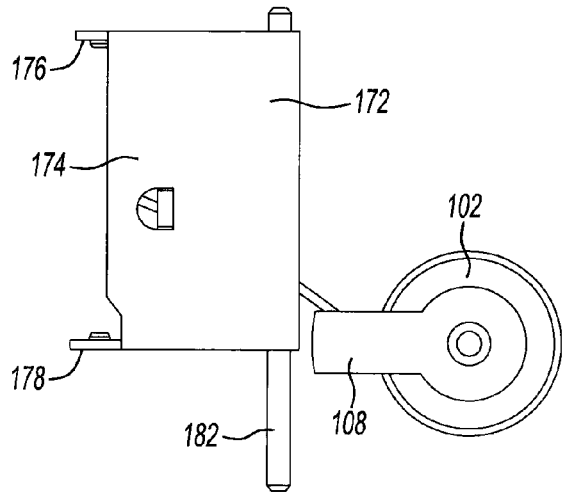
FIGS. 15 and 16 are simplified front and rear side views of the compliant shifting mechanism.
Figure 16:
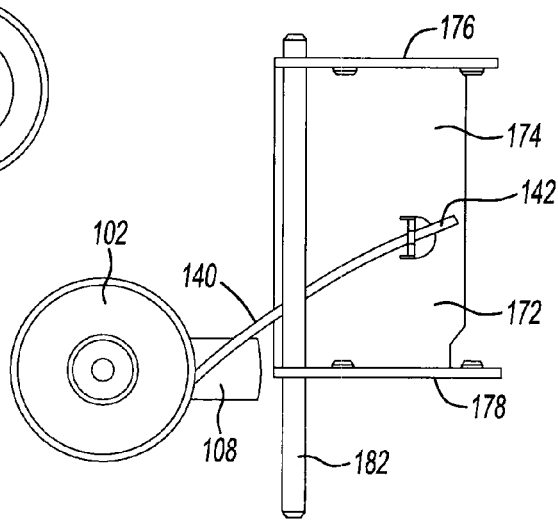
Figure 17:
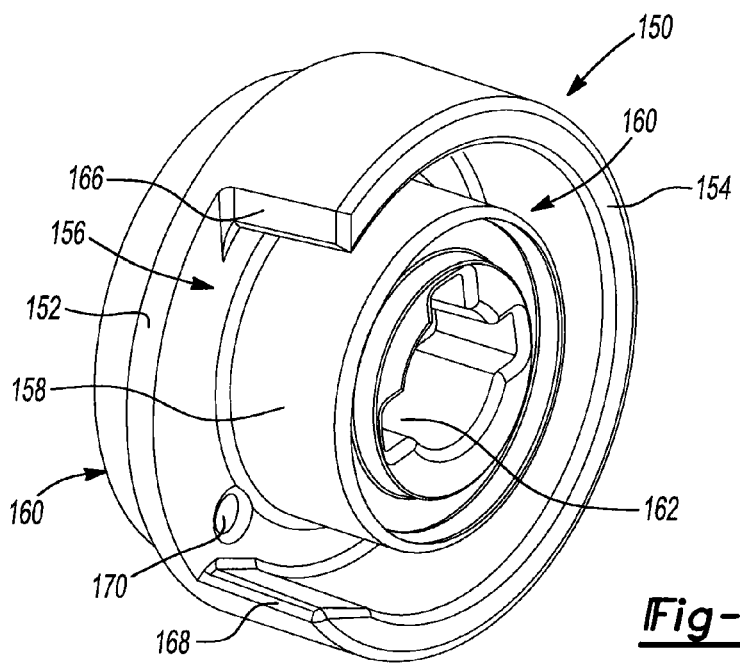
FIG. 17 is a perspective view of the spring holder of the compliant shifting mechanism.

Compliant shifting mechanism 100 can include a sliding member 172 which can be generally U-shaped and can include a base wall 174 which can extend parallel with axis 94 and first and second walls 176, 178 that extend from base wall 174 approximately perpendicular to axis 94. First and second walls 176, 178 can be spaced apart so that both low-speed gear 86 and high-speed gear 90 can be disposed therebetween, as shown in FIGS. 6-8. First and second walls 176, 178 can each include an aligned opening 180 that can receive a guide pin 182 therethrough. Base wall 174 can include a receiving member 184 that can receive free end 142 of spring 140.

A pair of thrust washers 190 can be spaced on opposite sides of a thrust bearing 192 which can all be disposed on drive spindle 36 below second wall 178. A bearing 194 can be disposed on the top portion of drive spindle 36 above first wall 176. Low-speed gear 86 and high-speed gear 90 can be disposed on drive spindle 36 between first and second walls 176, 178 and can be maintained in a space relation by a spacer 196 (shown in FIGS. 2-4, 6, and 8). Referring now to FIGS. 6-7 and 15-16, compliant shifting mechanism 100 is operable to move speed-change gear set 92 longitudinally along axis 94 relative to drive spindle 36 through the rotation of lever 102. Lever 102 can be rotated about an axis 200 which can be perpendicular to axis 94. The rotation of lever 102 about axis 200 can cause free end 142 of spring 140 to impart a longitudinal force on sliding member 172 which in turn can impart a longitudinal force on speed-change gear set 92. Guide pin 182 can guide the movement of sliding member 172 and speed-change gear set 92. Speed-change gear set 92 can be moved longitudinally relative to drive spindle 36 in response to rotation of lever 102, as described in more detail below.

Referring now to FIGS. 18A-E, the force applied by spring 140 on speed-change gear set 92 via sliding member 172 can vary based upon the rotational position of lever 102 and the longitudinal position of speed-change gear set 92. For example, as shown in FIG. 18A, spring 140 can be configured to be retained within spring holder 150 with free end 142 extending through opening 156 approximately equal distance between ends 166, 168. This is a neutral position wherein free end 142 would not be biasing sliding member 172 and speed-change gear set 92 in any particular longitudinal direction. As lever 102 (and spring holder 150 due to being rotationally fixed to lever 102) is rotated counter-clockwise, in the view depicted, coiled section 144 can begin to wrap around projection 158 and free end 142 can impart a longitudinal force on speed-change gear set 92 toward chuck assembly 38 on the end of drive spindle 36. This force is a function of spring 140 resisting further winding of coiled section 144 and is referred to herein as a torsional resistance force. As lever 102 continues to be rotated, as shown in FIG. 18B, free end 142 will contact end 166 of outer wall 154. Up to this point, the force exerted by free end 142 continues to be the torsional resistance force as spring 140 resists further coiling around projection 158. As lever 102 continues to be rotated, spring 140 will no longer attempt to be further wound around projection 158 and, rather, the portion of free end 142 extending beyond end 166 of outer wall 154 will now act as a cantilevered beam that will resist bending and apply a different force on speed-change gear set 92 as lever 102 is rotated and free end 142 resists bending around end 166. This force is referred to herein as bending resistance force. The bending resistance force of free end 142 is greater than the torsional resistance force. As a result, the force imparted on speed-change gear set 92 will increase when the bending resistance force is being imparted instead of the torsional resistance force. The bending resistance force occurs as lever 102 continues to be rotated and free end 142 bends around end 166, as can be seen when comparing FIGS. 18B and 18C.

If lever 102 is now rotated clockwise, in the views depicted, spring 140 will change from applying the bending resistance force, to the torsional resistance force, back to the neutral force, as shown in FIG. 18A. Continued clockwise rotation of lever 102 results in spring 140 resisting unwinding of coiled section 144 and imparts a torsional resistance force on speed-change gear set 92 via sliding member 172 that will assist in moving speed-change gear set 92 longitudinally along axis 94 away from chuck assembly 38 on the end of drive spindle 36. As lever 102 continues to be rotated, as shown in FIG. 18D, free end 142 will contact end 168 of outer wall 154. Further rotation of lever 102 changes the force exerted by spring 140 to the bending resistance force as spring 140 will no longer attempt to be unwound around projection 158 and, rather, the portion of free end 142 extending beyond end 168 of outer wall 154 will now act as a cantilevered beam that will resist bending, as shown in FIG. 18E. As a result, during the rotation of lever 102 from the neutral position, FIG. 18A, to the position shown in FIG. 18E, spring 140 will first apply the torsional resistance force and then the bending resistance force on speed-change gear set 92 via sliding member 172.

Thus, compliant shifting mechanism 100 of the present disclosure can apply a varying degree of force on speed-change gear set 92 as lever 102 is rotated. The force imparted can be a torsional resistance force and a bending resistance force (which is larger than the torsional resistance force) which can impart movement on speed-change gear set 92 to switch between the high-speed and low-speed operating conditions.

Figure 19A:
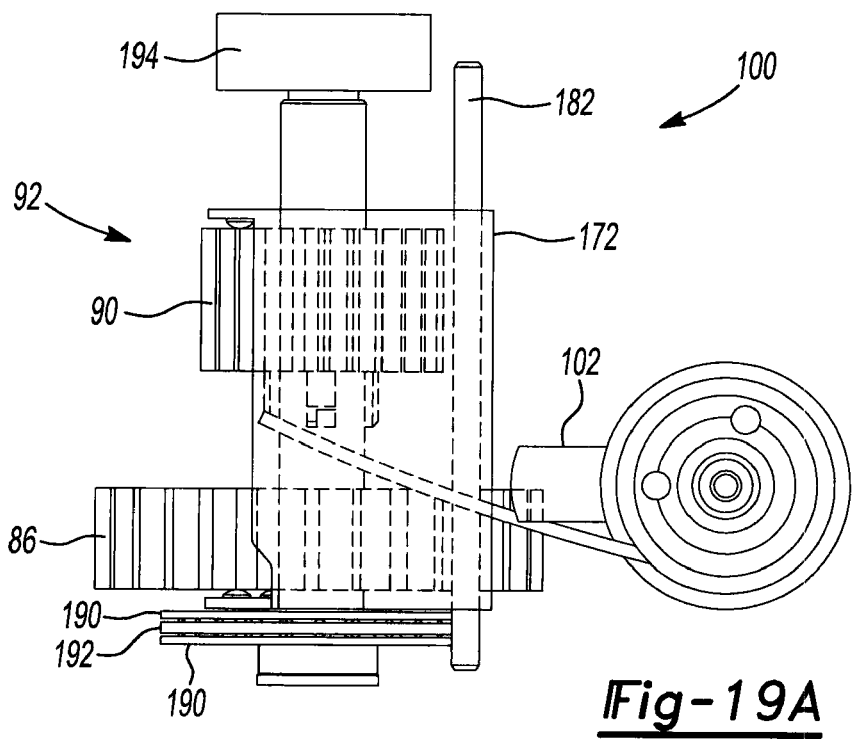

Referring now to FIGS. 19A-G, operation of compliant shifting mechanism 100 is shown. In FIG. 19A, compliant shifting mechanism 100 and speed-change gear set 92 is in the high-speed condition with speed-change gear set 92 at its lowermost, in the views depicted, position. Lever 102 can be in a first position which corresponds to the high-speed condition. In this position, detent members 124 can be engaged with pockets 114 on lever 102 to provide the user a tactile sensation of proper positioning of lever 102 in the high-speed position. The engaging of detent members 124 can also maintain lever 102 in the high-speed position in the event that speed-change gear set 92 has not completed the transition to the high-speed position, as described below.

In the high-speed position, spring 140 can be engaged with end 166 and can be undergoing beam bending. As a result, spring 140 can impart the bending resistance force onto speed-change gear set 92. This force can help maintain speed-change gear set 92 in the high-speed position during operation of power tool 20.

Figure 19B:
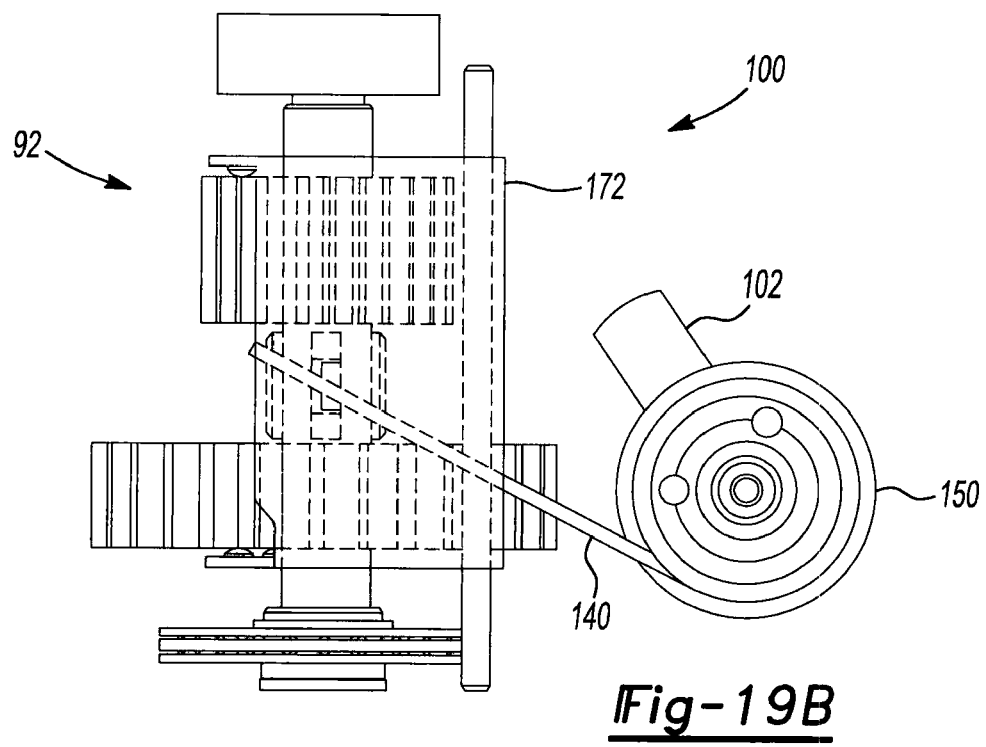
Figure 19C:
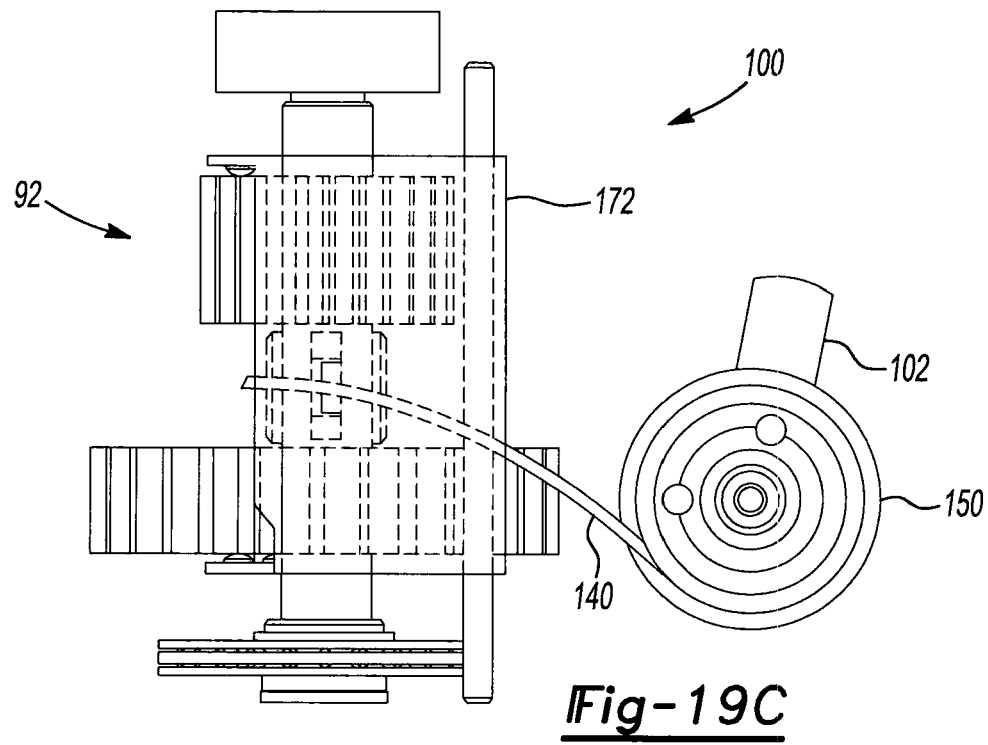

When it is desired to change from high-speed operation to low-speed operation, a user can rotate lever 102 from the first position, shown in FIG. 19A, through intermediate positions, such as that shown in FIG. 19B, to a second position, as shown in FIG. 19C, which corresponds to the low-speed position. During rotation of lever 102 between the high-speed position and the low-speed position, detent members 124 disengage from pockets 114 and re-engage with different pockets 114. Detent members 124 can engage with different pockets 114 when lever 102 is rotated to the low-speed position, as shown in FIG. 19C. This engagement provides a user with a tactile sensation that can inform the user that the transition from the high-speed to low-speed operation condition has been achieved. Additionally, the engagement of detent members 124 can also help maintain lever 102 in the low-speed position as speed-change gear set 92 transitions from the high-speed position to the low-speed position under the force of spring 140.

As lever 102 is rotated from the high-speed position to the low-speed position, spring 140 removes the downward (in the views depicted) longitudinal force imparted on speed-change gear set 92 and replaces it with an upward (in the views depicted) longitudinal force. The upward longitudinal force is initially the torsional resistance force. When free end 142 of spring 140 engages with end 168, spring 140 transitions from applying the torsional resistance force to the bending resistance force. The ability of free end 142 to deflect as a beam enables a user to fully engage lever 102 in the low-speed position with detent members 124 engaged. This is so regardless of speed-change gear set 92 fully moving from the high-speed position to the low-speed position. This is illustrated in FIG. 19C where speed-change gear set 92 has not fully moved into the low-speed position due to a misalignment between splines 101 on drive spindle 36 and recesses 105 on low-speed gear 86 while lever 102 is in the low-speed position.

Figure 19D:
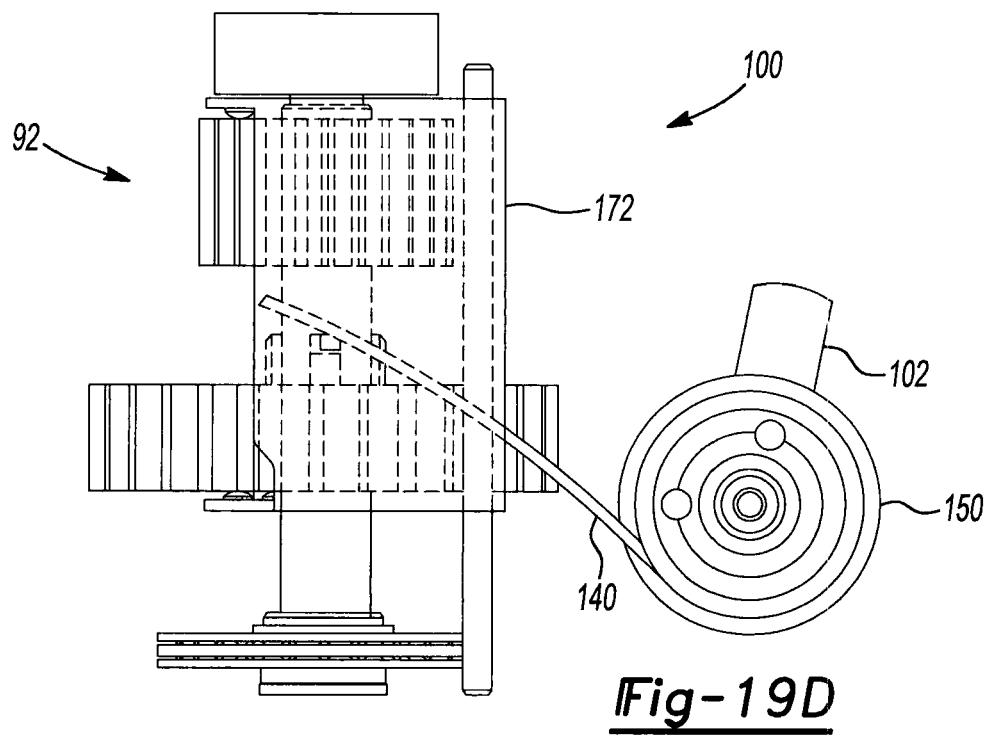

With lever 102 fully engaged in the low-speed position, a user is not required to continue to hold lever 102 in that position waiting for the proper alignment. Rather, compliant shifting mechanism 100 according to the present disclosure allows the user to let go of lever 102 once it is in the low-speed position while spring 140 continues to bias speed-change gear set 92 toward the low-speed position. The user can then either rotate drive spindle 36 manually, such as by rotating chuck assembly 38, or can engage trigger assembly 28 to energize motor 32 which drives transmission 34. As transmission 34 is driven, low-speed gear 86 will rotate relative to drive spindle 36 and speed-change gear set 92 will complete the transition to the low-speed condition when splines 101 are aligned with recesses 105, as shown in FIG. 19D. The bending resistance force maintains speed-change gear set 92 in the low-speed position during operation of power tool 20.

Figure 19E:
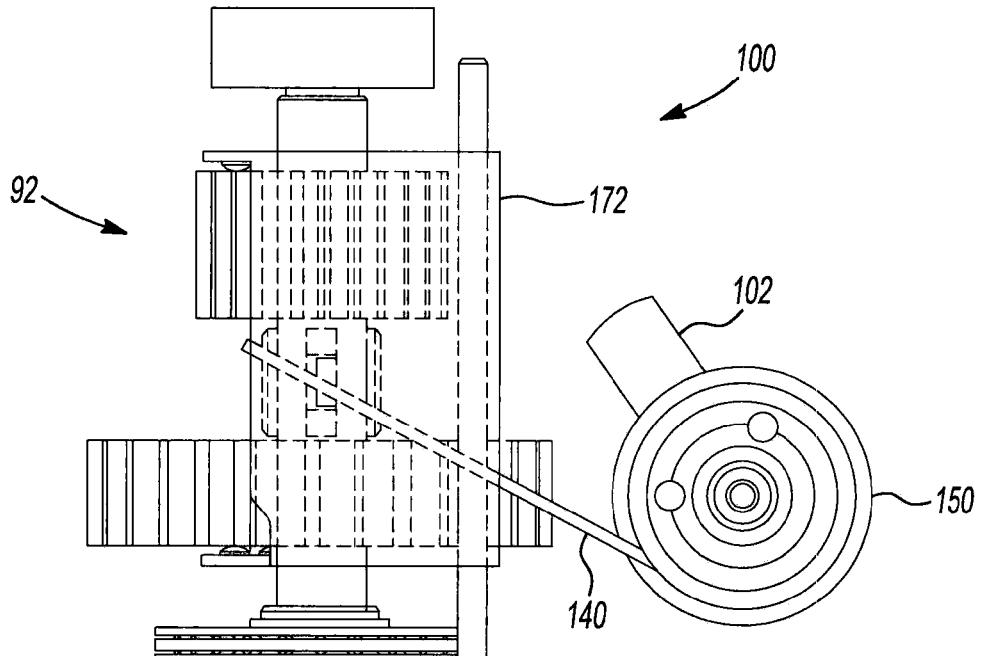
Figure 19F:
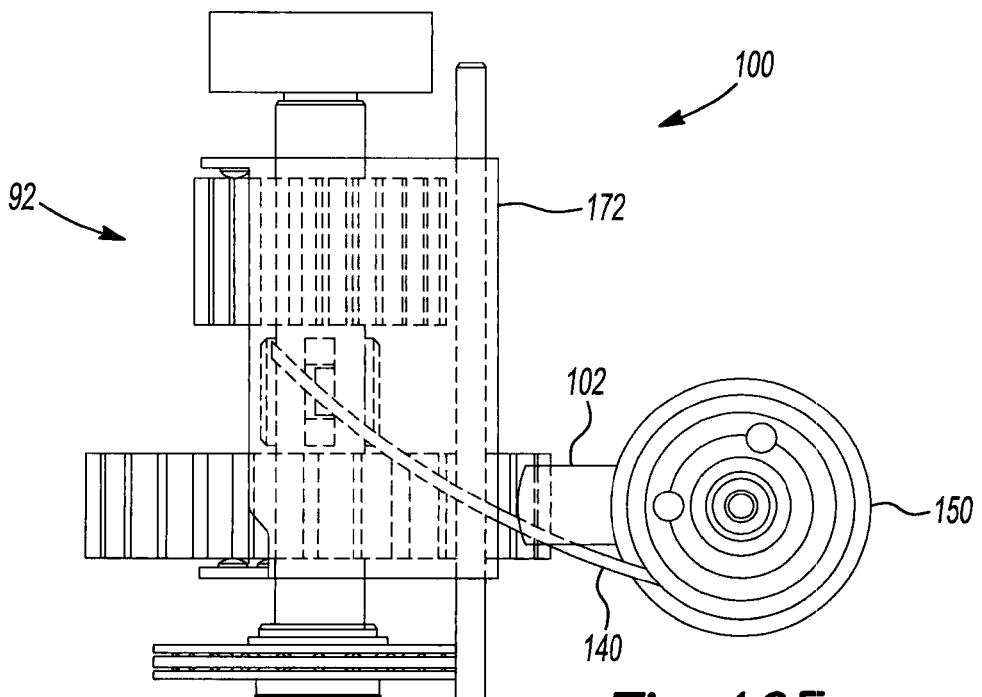

When it is desired to move compliant shifting mechanism 100 from the low-speed position to the high-speed position, the user rotates lever 102 counter-clockwise, in the views depicted, from the engaged low-speed position, as shown in FIG. 19D, through intermediate positions, such as that shown in FIG. 19E, to the fully engaged high-speed position, as shown in FIG. 19F. Again, when in the high-speed position, detent members 124 will engage with pockets 114 to provide the user with a tactile sensation of the completion of the shifting operation along with maintaining lever 102 in the high-speed position.

Figure 19G:
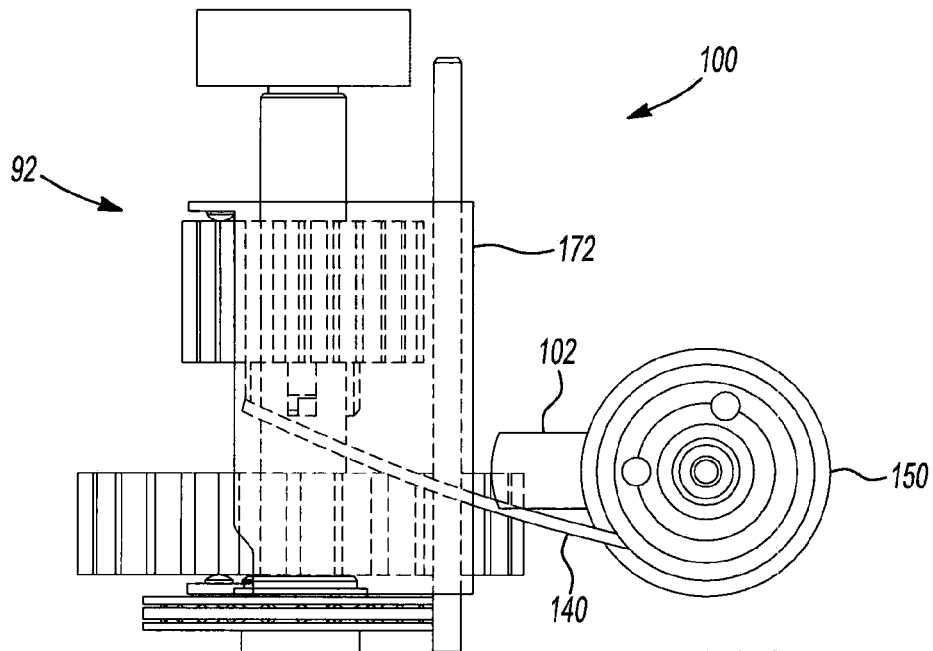

During the rotation of lever 102 from the low-speed position to the high-speed position, spring 140 removes the upward (in the views depicted) longitudinal force imparted on speed-change gear set 92 and replaces it with a downward (in the views depicted) longitudinal force. The downward force is initially the torsional resistance force, as shown in FIG. 19E, and transitions to the bending resistance force, as shown in FIGS. 19F and 19G, when free end 142 engages with end 166. As shown in FIG. 19F, speed-change gear set 92 may not immediately complete the change from the low-speed position to the high-speed position, such as when splines 101 are not aligned with recesses 103 on high-speed gear 90. As discussed above with reference to transition to the low-speed operation, the complete transition to the high-speed operating condition can be achieved by rotation of drive spindle 36 relative to high-speed gear 90 either through the user manually rotating drive spindle 36, such as via chuck assembly 38, or by activating trigger assembly 28 to engage motor 32 and drive transmission 34. When the proper alignment has been realized, speed-change gear set 92 completes its downward, in the views depicted, movement to the high-speed position, as shown in FIG. 19G. Again, spring 140 will continue to impart the bending resistance force on speed-change gear set 92 to maintain speed-change gear set in the high-speed position during operation of power tool 20.

Thus, compliant shifting mechanism 100 according to the present disclosure can provide two distinct forces on speed-change gear set 92 during movement between the low-speed and high-speed positions. Additionally, compliant shifting mechanism 100 can provide a user with a tactile sensation of the completion of the transition between the high-speed and low-speed operating conditions without speed-change gear set 92 completing the full transition. Moreover, compliant shifting mechanism 100 can automatically complete the change between the high-speed and low-speed positions, regardless of the initial alignment between drive spindle 36 and speed-change gear set 92. Furthermore, when drive spindle 36 and speed-change gear set 92 are not initially aligned when the user rotates lever 102, proper alignment can be achieved by the user either manually rotating drive spindle 36 or rotating drive spindle 36 by activating trigger assembly 28 and energizing motor 32 to drive transmission 34. In either case, the user is not required to maintain or hold onto lever 102, as lever 102 can be fully engaged in the high or low-speed positions regardless of the initial alignment between drive spindle 36 and speed-change gear set 92.

It should be appreciated that when speed-change gear set 92 is moved between the high and low positions, proper alignment may be immediately realized and a delay in full engagement may not occur.

It should be appreciated in light of the disclosure that the showing of power tool 20 as a right-angle drill is but one example in which compliant shifting mechanism 100 can be used. Compliant shifting mechanism 100 can be used in various power tools, consumer goods, and/or any device with rotary power where the ability to move a gear set between operating positions can be a benefit. Examples include, but are not limited to, saws, yard tools, vacuums, routers, etc.

In the example discussed above, low-speed gear 86 and high-speed gear 90 are separate gears that move relative to drive spindle 36. The gears can engage and disengage to drive spindle 36 by engaging with splines 101 formed on drive spindle 36 that can engage with recesses 103, 105 on the gears. In one longitudinal position along drive spindle 36, the splines and recesses can be engaged and, in other longitudinal positions, the splines and recesses can be separated (i.e., longitudinally disposed from one another) so that the gear can spin freely around drive spindle 36. It will be appreciated that the splines, recesses, gear teeth, etc. can be formed with various suitable manufacturing processes, such as hobbing, index milling, grinding, etc. In other examples, the gears, splines, etc. can be formed with powdered metal forming techniques.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A power tool shifting mechanism comprising:
a first member movable between first and second positions;
a shifting member coupled to at least one drive member and moving between third and fourth positions in response to movement of the first member between the respective first and second positions, the at least one drive member moving with movement of the shifting member; and
a compliant member coupled to the first member and to the shifting member, the compliant member causing the shifting member to move between the third and fourth positions in response to movement of the first member between the respective first and second positions, the compliant member applying a first force of a first magnitude on the shifting member that biases the shifting member toward the fourth position during a first portion of movement of the shifting member from the third position to the fourth position and applying a second force of a second magnitude on the shifting member that biases the shifting member toward the fourth position during a second portion of movement of the shifting member from the third position to the fourth position, the first and second magnitudes being different from one another;

wherein the first member can move fully to the second position regardless of the shifting member moving fully into the fourth position.

2. The shifting mechanism of claim 1, wherein the shifting member can only move fully into the fourth position when the at least one drive member is aligned with another member.

3. A power tool shifting mechanism comprising:
a first member movable between first and second positions;
a shifting member coupled to at least one drive member and moving between third and fourth positions in response to movement of the first member between the respective first and second positions, the at least one drive member moving with movement of the shifting member; and
a compliant member coupled to the first member and to the shifting member, the compliant member causing the shifting member to move between the third and fourth positions in response to movement of the first member between the respective first and second positions, the compliant member applying a first force of a first magnitude on the shifting member that biases the shifting member toward the fourth position during a first portion of movement of the shifting member from the third position to the fourth position and applying a second force of a second magnitude on the shifting member that biases the shifting member toward the fourth position during a second portion of movement of the shifting member from the third position to the fourth position, the first and second magnitudes being different from one another;
wherein the first force is a torsional resistance force and the second force is a bending resistance force.

4. The shifting mechanism of claim 3, wherein the compliant member is a torsion spring having a free end coupled to the shifting member.

5. The shifting mechanism of claim 4, further comprising a spring holder coupled to the first member and moving with movement of the first member, the spring holder having a wall with an opening therethrough, the spring being disposed in the spring holder with a fixed end of the spring engaged with the spring holder and the free end of the spring extending through the opening, the spring providing the first force when the free end is disposed between ends of the opening and providing the second force when the free end is engaged with one of the ends of the opening.

6. The shifting mechanism of claim 5, wherein the first member rotates between the first and second positions.

7. A power tool comprising:
a motor;
an output member;
a transmission coupling the motor to the output member, the transmission driving movement of the output member in response to energization of the motor, the transmission including a gear set that is movable between a first position corresponding to a first operating condition and a second position corresponding to second operating condition;
a shifting mechanism moving the gear set between the first and second positions, the shifting mechanism including:
a manually operated first member moving between third and fourth positions;
a shifting member coupled to the gear set and moving between fifth and sixth positions in response to movement of the first member between the respective third and fourth positions, the gear set moving between the first and second positions with movement of the shifting member between the respective fifth and sixth positions; and
a compliant member coupled to the first member and to the shifting member, the compliant member causing the shifting member to move between the fifth and sixth positions in response to movement of the first member between the respective third and fourth positions, the compliant member applying a first force of a first magnitude on the shifting member that biases the shifting member toward the sixth position during a first portion of movement of the shifting member from the fifth position to the sixth position and applying a second force of a second magnitude on the shifting member that biases the shifting member toward the sixth position during a second portion of movement of the shifting member from the fifth position to the sixth position, the first and second magnitudes being different from one another;
wherein the first member can move fully to the second position regardless of the gear set and shifting member moving fully into the respective second and sixth positions.

8. The power tool of claim 7, wherein the shifting member can only move fully into the sixth position when at least one gear of the gear set is aligned with the output member.

9. The power tool of claim 7, further comprising a retaining mechanism that retains the first member in the third and fourth positions regardless of a position of the gear set and the shifting member, the retaining mechanism providing a tactile sensation of the first member being in the third and fourth positions.

10. The power tool of claim 7, wherein the first and second operating conditions are different operating speeds of the output member.

11. A power tool comprising:
a motor;
an output member;
a transmission coupling the motor to the output member, the transmission driving movement of the output member in response to energization of the motor, the transmission including a gear set that is movable between a first position corresponding to a first operating condition and a second position corresponding to second operating condition;
a shifting mechanism moving the gear set between the first and second positions, the shifting mechanism including:
a manually operated first member moving between third and fourth positions;
a shifting member coupled to the gear set and moving between fifth and sixth positions in response to movement of the first member between the respective third and fourth positions, the gear set moving between the first and second positions with movement of the shifting member between the respective fifth and sixth positions; and
a compliant member coupled to the first member and to the shifting member, the compliant member causing the shifting member to move between the fifth and sixth positions in response to movement of the first member between the respective third and fourth positions, the compliant member applying a first force of a first magnitude on the shifting member that biases the shifting member toward the sixth position during a first portion of movement of the shifting member from the fifth position to the sixth position and applying a second force of a second magnitude on the shifting member that biases the shifting member toward the sixth position during a second portion of movement of the shifting member from the fifth position to the sixth position, the first and second magnitudes being different from one another;

wherein the first force is a torsional resistance force and the second force is a bending resistance force.

12. The power tool of claim 11, wherein the compliant member is a torsion spring having a free end coupled to the shifting member.

13. The power tool of claim 12, wherein the shifting mechanism further comprises a spring holder coupled to the first member and moving with movement of the first member, the spring holder having a wall with an opening therethrough, the spring being disposed in the spring holder with a fixed end of the spring engaged with the spring holder and the free end of the spring extending through the opening, the spring providing the first force when the free end is disposed between ends of the opening and providing the second force when the free end is engaged with one of the ends of the opening.

14. The power tool of claim 13, wherein the first member rotates between the third and fourth positions.

15. A method of switching operation of a power tool between a first operating condition and a second operating condition, the method comprising:
 manually moving a first member between a first position corresponding to a first operating condition and a second position corresponding to a second operating condition;
 moving a shifting member coupled to the first member with a compliant member between third and fourth positions in response to movement of the first member between the respective first and second positions, the compliant member being coupled to the first member;
 moving at least one drive member with movement of the shifting member, the at least one drive member coupled to the shifting member, and movement of the at least one drive member changing operation of the power tool between the first and second operating condition;
 axially rotating the compliant member during a first portion of movement of the shifting member from the third position to the fourth position, thereby creating a torsional resistance force in the compliant member, the torsional resistance force having a first magnitude; and
 bending the compliant member during a second portion of movement of the shifting member from the third position to the fourth position, thereby creating a bending resistance force in the compliant member, the bending resistance force having a second magnitude, the first and second magnitudes being different from one another.

16. The method of claim 15, wherein moving the first member between the first and second positions includes fully moving the first member between the first and second positions regardless of a position of the at least one drive member and further comprising releasably engaging a detent member extending from the power tool with one of a plurality of detent pockets created in the first member to releasably retain the first member in the first or second position.

17. The method of claim 15, wherein the axially rotating step is performed prior to the bending step thereby creating the axial resistance force prior to the bending resistance force, and the first magnitude is less than the second magnitude.

18. The method of claim 15, wherein the compliant member is a torsional spring having a coiled section and a free end, and wherein during the axially rotating step the coiled section is axially rotated, and during the bending step the free end is bended.

* * * * *